Nov. 20, 1951     R. N. TAMSEN     2,575,643
POPCORN WARMER
Filed April 5, 1948     2 SHEETS—SHEET 1
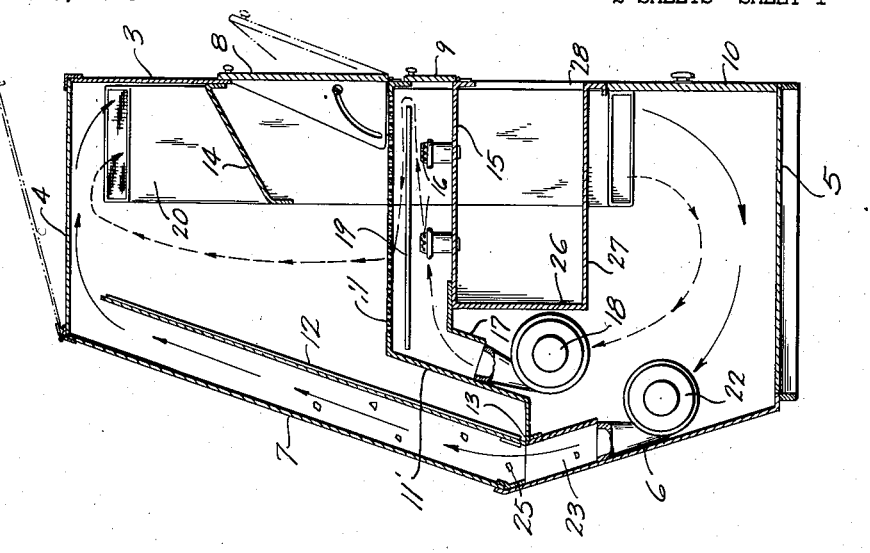
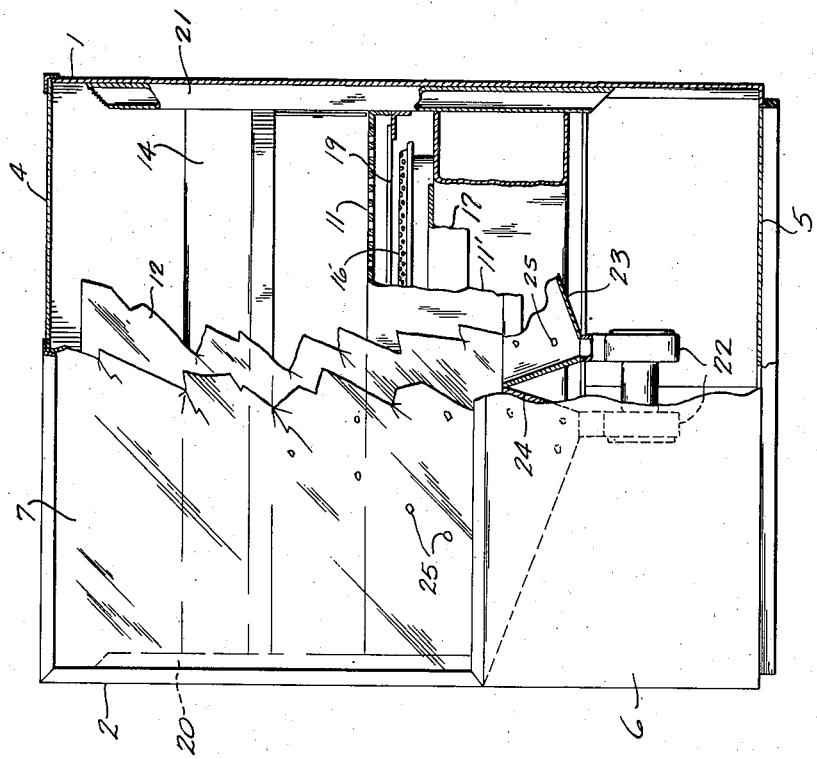
INVENTOR.
Rudolf N. Tamsen
BY
David G. Fry
Attorney

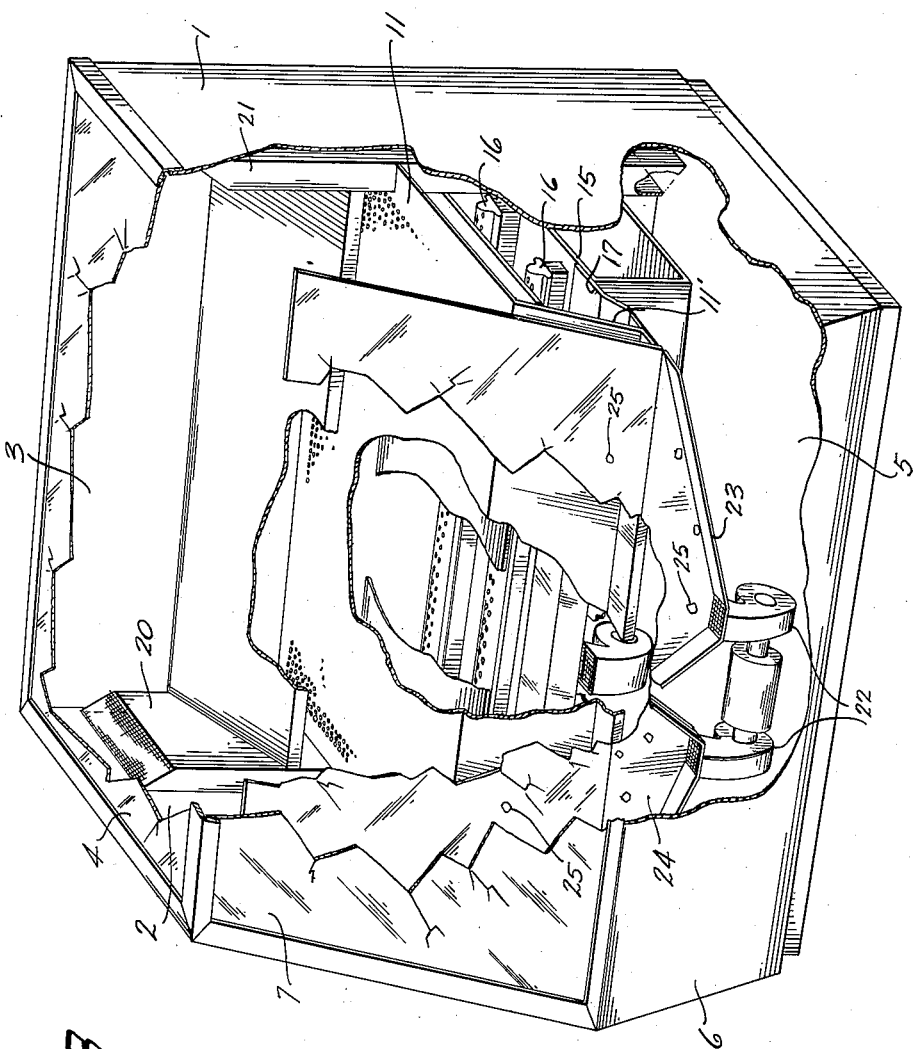

Patented Nov. 20, 1951

2,575,643

UNITED STATES PATENT OFFICE 2,575,643

POPCORN WARMER

Rudolf N. Tamsen, Milwaukee, Wis., assignor to Supurdisplay, Incorporated, Milwaukee, Wis., a corporation of Wisconsin Application April 5, 1948, Serial No. 18,961

4 Claims. (Cl. 34—225)

This invention relates to popped corn warming cabinets and it resides in an improved cabinet of this class in which an inner popped corn warming container provided with warming air forcing means for forcing warming air through the popped corn is enclosed in and surrounded by an outer cabinet spaced from the warming container to provide circulation passages through which air forcing means compel a circulation of air in contact with the cabinet walls in addition to that circulation produced by the warming air forcing means for the purpose of preventing formation of condensation of volatile matter upon the cabinet walls.

In the retail dispensing of popped corn the practice of popping the corn at the point of sale suffers the disadvantage that the popping facilities usually employed are small, and not subject to precise and careful regulation. Much, therefore, depends upon the skill of the attendant in producing a popped corn of high and uniform quality. Also, the attendant's primary function of selling is hindered by the necessity of attending to the popping facilities. For these and other reasons attempts have been made to prepare the popped corn in large, central popping plants from which it is distributed to retail outlets which dispense the popped corn from cabinets.

In order that the popped corn so dispensed be palatable and possessed of the characteristic crispness and flavor which the trade demands, it is necessary that it be warmed and held at a crisping temperature until the time of sale. Dispensing cabinets used for this purpose are, therefore, usually equipped with electrical resistance warming means for maintaining the desired temperature. In the form in which such warming cabinets have heretofore been employed an undesirable residue of condensed volatile matter derived from the corn becomes deposited upon the interior walls of the cabinet and this deposit through rancidification and fermentation acquires a disagreeable odor which contaminates the corn.

It is the discovery of this invention that if the popped corn is held in a container through which the warming air is compelled to pass and this container is in turn enclosed within a cabinet spaced from the container and separate air forcing means compel a secondary merging circulation of air in contact with the cabinet walls, the popped corn can be kept in the desired crisp condition without deposit of residue upon the interior of the cabinet. The above and other objects and advantages of this invention will become apparent from the description which follows and from the drawings forming a part hereof in which there is set forth by way of illustration and not of limitation one form in which a popped corn warming cabinet of this invention may be constructed.

In the drawings:

Fig. 1 is a front view in elevation with parts broken away and in section of one form in which the popped corn warming cabinet of this invention may be constructed;

Fig. 2 is an end view in elevation and in section of the cabinet shown in Fig. 1 viewed through the plane 2—2 indicated in Fig. 1, and Fig. 3 is a perspective view with parts broken away of the cabinet shown in Fig. 1.

Referring now to the drawings, the apparatus of this invention, in the form there illustrated, is shown made up of an outer cabinet having end walls 1 and 2, a back wall 3, a top 4, a bottom 5, a lower inclined front wall 6 and an upper inclined front wall 7. For display and other purposes the upper front wall 7 and the top 4 are preferably formed of glass. The back wall 3 is provided with a downwardly opening access door 8 through which popped corn may be withdrawn, a downwardly opening access door 9 to provide access to heater elements to be described hereinafter and removable panel 10 to provide access to the lower air volume space of the cabinet.

Mounted within and enclosed by the cabinet is a popped corn container made up of a horizontal foraminous container floor 11 with a sloping forward portion 11' which is held rigidly in place at a level about midway of the height of the cabinet. The popcorn container is completed by an inclined front wall 12 preferably composed of glass for display purposes which extends downwardly to join the sloping forward portion of the floor 11' at the point 13. By reason of this construction and the transparent nature of walls 7 and 12 the popped corn contained within the cabinet is displayed to good advantage. Cooperating with the foraminous floor 11 and the wall 12 is an inclined hopper member 14 which serves to direct the popped corn in its downward flow to a position where it may be easily scooped up by the attendant when the access door 8 is opened.

For convenience in filling the container the top 4 is preferably hingedly attached as indicated in Fig. 2 so that it may be raised to facilitate the placing of popped corn within the container.

Beneath the foraminous floor 11 and mounted upon a shelf 15 are a pair of electrical resistance bar heaters 16 connected by means not shown with a source of electric power. The shelf 15 is joined by a flange 17 with the discharge throat of a motor driven air forcing blower 18 as appears more clearly in Fig. 2. In this manner the flange 17 and the lower extension 11' of the floor 11 cooperate to form an enclosure which compels the air discharged by the blower 18 to pass over the heaters 16 and from thence upwardly through the openings in the foraminous floor 11 and into and through the popcorn held thereon. To render the distribution of heated air delivered to the popcorn more uniform a horizontal baffle 19 occupies a position directly above the heaters 16 as shown.

The air delivered by the blower 18 is drawn from the lower part of the cabinet and passes upwardly as indicated by the dotted line arrows in Fig. 2 to the upper part of the cabinet where it enters the tops of return ducts 20 and 21 disposed against the end walls 1 and 2 of the cabinet. The return ducts 20 and 21 are closed by screens at their upper ends to prevent loose corn from being accidentally dropped into the lower part of the cabinet. In this way a continuous circulation of warming air is compelled to pass through the corn keeping it at a crisping temperature.

In order to prevent deposit of undesirable residues upon the interior of the walls of the cabinet a pair of air-forcing, motor-driven blowers 22 is located in the lower part of the cabinet and connected by means of diverging throats 23 and 24 with the space between the upper front wall 7 of the cabinet and the wall 12 of the popcorn container. The stream of air propelled by the blowers 22 is drawn from the lower part of the cabinet as shown by the unbroken arrows in Fig. 2 and is forced upwardly through the space between walls 7 and 12, as previously described. The stream then flows across the lower face of the top 4 of the cabinet while merging with the warming air stream whereupon it divides and enters the return ducts 20 and 21 through which it passes to the lower part of the cabinet for re-circulation. To a certain extent this circulation mingles with the warming air circulation which passes through the popcorn with the result that the temperature of the stream circulated by the blowers 22 becomes raised. Since there is little resistance to the circulation produced by the blowers 22 and since substantially greater forcing effect is produced by the two blowers 22, the stream of air compelled thereby moves at a rate greatly in excess of the rate of the warming air which is passed through the poped corn. This high rate of flow together with the increased temperature produces a condition at the surface of the interior walls of the cabinet which inhibits deposits of undesirable residues.

If desired, and for the purpose of giving a visual indication of the functioning of the cabinet wall circulation, small particles of material of low density preferably simulating poped corn granules such as are indicated at 25 may be placed within the diverging throats 23 and 24 from whence they will be repeatedly thrown upwardly by the air stream into the space between the transparent walls 7 and 12 where the motion of the same may be easily observed.

For the convenience of the attendant the space between the shelf 15 is enclosed by the wall 26 and the sub-shelf 27, to provide storage space within which bags, boxes or other containers may be stored. The space between the shelves 15 and 17 is preferably made accessible by an unclosed opening 28 in the back wall 3.

The heating elements 16 and the blower 18 are preferably joined by electrical connections not shown through a single switch with a source of electric power so as to avoid the excessive temperature condition which might prevail if the heaters 16 were operated without the circulation produced by the blower 18. The blowers 22, if desired, may also be connected to start to operate simultaneously with the blower 18 and the heaters 16.

In operation a charge of popped corn is placed upon the floor 11 by introducing the same through the removable top 4 and filling to a point above the level of the hopper member 14. The heating element 16 and the blowers 18 and 22 are then energized. Air discharged by the blower 18 is drawn from the lower part of the cabinet and discharged toward the heater 16 from whence it flows around the baffle 19, passes upwardly through the popped corn reposing upon the floor 11 heating it to a crisping temperature. As soon as the popped corn reaches crisping temperature it is ready to be served.

The air passing through the corn to a certain extent causes evaporation of moisture and other volatile constituents of the corn. Since the volume of air thus charged with volatile constituents is small, contact of the same with the cabinet walls would be insufficient to raise the temperature of the walls materially. To prevent condensation which would ensue on this account a larger volume of air is drawn from the lower part of the cabinet by the blowers 22 and passed in contact with the cabinet walls in the manner described. This stream of larger circulation is continually merged with and divided from the higher temperature stream passing through the corn, thus causing the blended stream to attain a somewhat elevated temperature. Continual passage of this larger stream in contact with the cabinet walls has a sufficient warming effect to raise the temperature of the walls sufficiently so that little or no condensation of volatile constituents upon the cabinet walls occurs. In this way deposits having a tendency to become rancid or fermented are avoided and a sweet and wholesome condition within the cabinet is maintained. Also, volatile flavor constituents of the corn, which if continually removed and deposited upon the cabinet walls would impair the palatableness of the popped corn, are maintained in substantial concentration in the air stream contacting the popped corn with the result that the rate of loss of such constituents from the corn is substantially diminished. As a result, corn maintained within the cabinet retains a pleasant, palatable condition closely resembling that of freshly popped corn.

I claim:

1. In a popcorn warming apparatus the combination comprising a cabinet, a horizontal foraminous floor disposed midway between the top and bottom of said cabinet dividing the same into upper and lower portions, said foraminous floor being adapted to support a body of popcorn disposed thereon, heating means beneath said floor, a first air forcing means disposed below said heating means adapted to draw air from the lower part of said cabinet and compel the movement of the same over said heating means and through said foraminous floor into the upper part of said cabinet, a vertical return passage within said cabinet extending from a point above said foraminous floor to a point below the same, said return passage being open to receive air discharged into the upper part of said cabinet and to return and discharge the same into the lower part of said cabinet, an upwardly extending container wall joined with said foraminous floor and spaced inwardly from the inner surface of said cabinet to form a circulation channel extending from the lower part of said cabinet to the upper part of said cabinet, and second air forcing means adapted to compel an upward circulation of air in said circulation channel.

2. In a popcorn warming apparatus the combination comprising a cabinet, a foraminous floor within said cabinet, a first air forcing means disposed beneath said foraminous floor in air forcing relationship thereto adapted to compel movement of air from beneath said foraminous floor upward and through said floor, air heating means disposed within the movement of air from beneath said foraminous floor upward and through said floor, a return passage within said cabinet extending from a point above said foraminous floor to a point below the same, a partition wall joined with said foraminous floor and spaced inwardly from the wall of said cabinet forming a circulation channel extending from beneath said foraminous floor to a point above said foraminous floor, and a second air forcing means disposed in air forcing relationship to said circulation channel adapted to compel a circulation of air upwardly through said channel.

3. In a popcorn warming apparatus the combination comprising a cabinet, a foraminous floor within said cabinet dividing the same into an upper part and a lower part, a first air-forcing means disposed beneath the foraminous floor positioned to receive air from the lower part of said cabinet, a first duct joined with the discharge of said first air-forcing means and with the lower side of said floor adapted to compel movement of air from beneath said foraminous floor upwardly and through said floor, a second duct extending from the upper part to the lower part of said cabinet to complete a primary recirculation channel extending from the lower part to the upper part of said cabinet and returning through which channel air is propelled by said first air-forcing means, air heating means disposed in said primary recirculation channel exposed in heating relation to the air stream passing therethrough, a partition wall spaced inwardly from the wall of said cabinet forming a third duct extending from beneath said foraminous floor to a point above said foraminous floor and forming with said second duct a secondary recirculation channel extending from the lower part of the cabinet to the upper part thereof and returning without passage through said floor, and a second air forcing means disposed in air forcing relationship to said secondary recirculation channel adapted to compel a circulation of air therethrough and upwardly through said third duct.

4. In an apparatus for warming dry food stuff the combination comprising a cabinet having upwardly extending walls, a top and a foraminous floor; a first air-forcing means; a first air conveying passage joining said first air-forcing means with the lower face of said foraminous floor adapted to confine air delivered by said first air-forcing means and cause the same to be propelled upwardly through said foraminous floor; air heating means disposed in said first air conveying passage adapted to heat air conveyed therethrough; a partition wall within said cabinet disposed adjacent a wall thereof extending upwardly from the floor and terminating below the top of said cabinet forming a channel for passage of air in contact with said adjacent cabinet wall; a second air-forcing means; a second air conveying passage, separate from the first, joining said second air-forcing means with the lower end of said channel formed by said partition and cabinet walls adapted to confine air delivered by said second air-forcing means to cause the same to be propelled upwardly through said channel; and an air escape passage opening from said cabinet connected to the air input entrances of said first and second air-forcing means to provide for a recirculation of air through said first and second air conveying passages and through said cabinet.

RUDOLF N. TAMSEN.

REFERENCES CITED

The following references are of record in the file of this patent:

UNITED STATES PATENTS

| Number | Name | Date |
| --- | --- | --- |
| 1,648,005 | Pritchard | Nov. 8, 1927 |
| 2,005,501 | Kelly | June 18, 1935 |
| 2,188,708 | Davis | Jan. 30, 1940 |
| 2,423,342 | Pinanski | July 1, 1947 |
| 2,458,190 | Newburger | Jan. 4, 1949 |

FOREIGN PATENTS

| Number | Country | Date |
| --- | --- | --- |
| 336,679 | Great Britain | Oct. 20, 1930 |